Dec. 12, 1967　　　　A. J. DAPOZ　　　　3,357,274

CONNECTOR ROD LINKAGE

Filed Jan. 13, 1966

INVENTOR
AUGUST J. DAPOZ

BY Edward H Casey

ATTORNEY

# United States Patent Office 3,357,274
Patented Dec. 12, 1967

3,357,274
CONNECTOR ROD LINKAGE
August J. Dapoz, St. Louis, Mo., assignor to ACF Industries, Incorporated, New York, N.Y., a corporation of New Jersey
Filed Jan. 13, 1966, Ser. No. 520,483
5 Claims. (Cl. 74—469)

This application relates to connector rods or links, and in particular relates to such a rod or link which is actuated at one end by a suitable mechanism to drive or move another mechanism at the other end of said rod or link.

Connector rods or links of the type herein disclosed are widely used in industrial and commercial applications. In a simple form of the connector, the rod or link is a length of cylindrical rod or wire having a hook at each end and the hooked portion passes through a hole in a suitable lever and is secured in place to prevent the rod from falling out of position. Numerous schemes have been used for securing the rod in position in the past. For example, the end of the rod has been provided with a groove and a spring member in the form of a hairpin or similar configuration is pressed into the groove to secure the end of the rod from removal from the hole that receives it. In other instances, other forms of spring retainers have been used, as well as certain types of washers. Still another arrangement has been the use of a hole or aperture in the driving or driven member in the form of a keyhole slot, in which case the end of the connector rod is provided with a flattened portion or tab which passes through the elongated portion of the keyhole and then when the lever arm and rod are rotated with respect to each other, the end of the rod is secured in place.

Each of the aforementioned methods of securing a connector rod has certain drawbacks. In some instances an additional securing member is required, and in others the relationship of the rod to the driving or driven member is position sensitive. There is also the undesirable feature that these prior art securing methods are most costly. In the case of a separate securing member, there is the added cost of the member itself and the added cost of the assembly operation. In the case of keyhole slotting, the punch and die are more costly and hence the operation of punching becomes more costly.

Accordingly, it is an object of this invention to provide a novel connector rod of simplified construction.

It is a further object of the invention to provide a connector rod that is not position sensitive.

Still another object of the invention is to provide a connector rod that is easy and simple to install and which is economical.

According to the invention, a connector rod having a bent-over end portion has the end flattened by a swaging operation, after which the resulting end or tab may be shaped if necessary by a die cutting operation to serve as a stop. The connector rod is then assembled to a driving or driven member by inserting the flattened end portion through a cylindrical hole and as the tip of the end portion clears the far side of the hole, the connector rod is rotated to its ultimate operative position whereby the stop portion then prevents withdrawal of the connector rod so long as it remains in that position.

In the description which follows, the connector rod of the invention will be described and shown as it might be used in a carburetor, but it is to be understood that the invention is suitable for use in many other industrial applications. The foregoing objects, advantages and features of the invention will be more clearly understood from a perusal of the following specification, claims and the drawing in which, FIGURE 1 illustrates a carburetor employing a pair of connector rods formed according to the invention.

Figure 1:
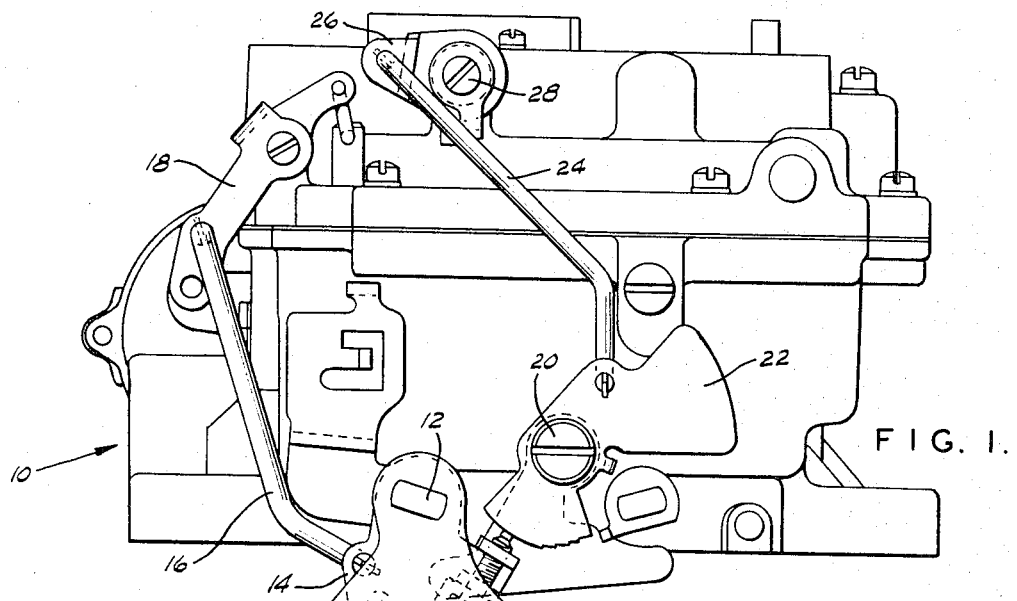

In FIGURE 1 there is shown generally at 10 a carburetor having an exposed shaft end 12, with a lever arm 14 attached thereto. A connector rod or link 16 of the invention connects the lever arm 14 to an accelerator pump lever arm 18. Also mounted on the carburetor by way of a pivot pin 20 is a fast idle cam 22, which connects by way of link or rod 24 to a choke lever arm 26. Arm 26 is attached to the end of a choke shaft 28.

Figure 2:
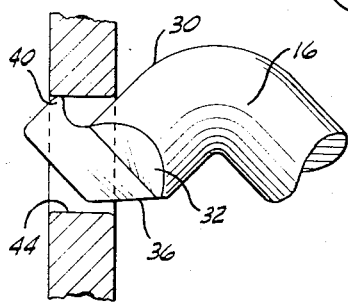
FIGURES 2, 3 and 4 show in detail the connector rod during the assembly operation.
Figure 2A:
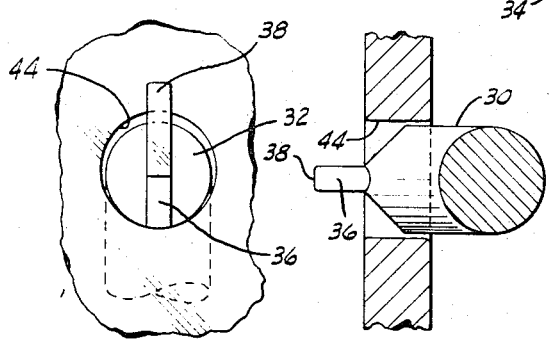
FIGURE 2A is a view of the end of the connector rod at an intermediate stage of manufacture.

Referring to FIGURES 2 and 2A, there is shown an end of a connector rod such as rod 16. In FIGURE 2A the method of formation of the end is illustrated. An end of the rod 30 is placed in a suitable die for a swaging operation. During the swaging operation the tip end of the rod is flattened out in a cold forming operation, and the material moved from the tapered shoulders 32 is forced outwardly to form an enlargement 34. The enlargement 34 is substantially of the ultimate thickness of the finished end of the rod. After the swaging operation, the tip is trimmed to the configuration shown in the dash lines of FIGURE 2A and as will be described later in connection with FIGURE 2. A trim line 36 approximately joins the center line of the end 30 and one extremity of the surface 32. The tip is also trimmed at the very end 38 and at an upper portion 39 to remove unnecessary material. A final trimming operation defines a locater or stop 40 and a recess 42.

In FIGURE 2 there is shown a driving or driven member which could be similar to either 14 or 18 of FIGURE 1, or any other similar member. A cylindrical hole 44 is drilled or punched into said member. To assemble the connector rod into the hole 44, the rod is tilted or cocked so that the stop or locater 40 enters the hole and the tip portion is made to follow. Surface 36 is spaced from stop 40 an amount such that it will clear the inner diameter of the hole as shown.

Figure 3:
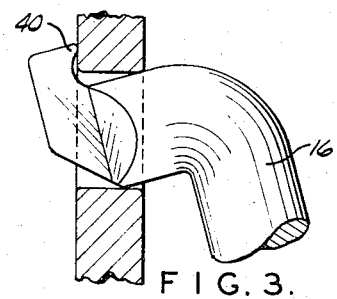
Figure 4:
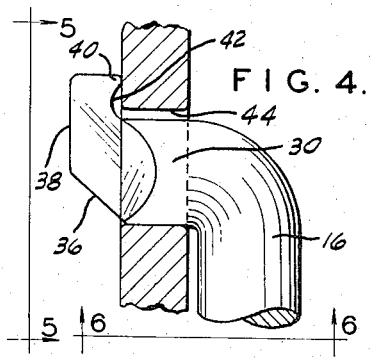

Upon continued movement of the connector rod into the hole 44, the stop 40 clears the wall of the member and the link is rotated slightly so that stop 40 moves upwardly with respect to the hole and serves as a pivot to aid in drawing the end of the rod into final position. See FIGURE 3. In FIGURE 4 the connector rod is shown in its final position and it will be seen that so long as the connector rod 16 remains in the position shown, which is the normal operative position, the stop 40 will prevent the end of the connector rod from being withdrawn from the hole 44.

Figures 5, 6:
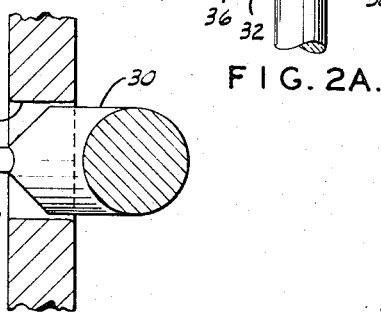
FIGURE 5 is an end view of the connector rod in place.
FIGURE 6 is a bottom plan view of the connector rod.

FIGURES 4, 5 and 6 illustrate the relationship of the parts together with an indication of the clearances involved. It will be seen that the diameter of the rod is smaller than that of the hole 44, and also that the swaging operation has reduced the thickness of the rod at its tip to approximately 20% of the original diameter. In a particular installation where a rod of .156 inch in diameter was used, the hole diameter was .160 inch for a nominal clearance of .004 inch. It is to be mentioned that the dimensions are subject to change according to use and that those cited are illustrative only.

Figure 7:
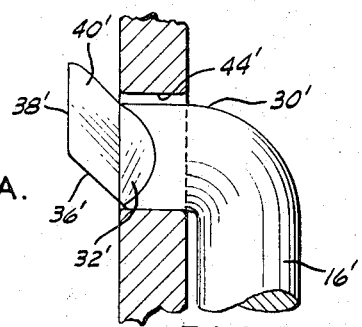
FIGURE 7 is a wide elevation of another form of the connector rod.

In FIGURE 7 there is shown a modified form of the invention where connector rods 16' having an end 30' is provided with a tip of slightly different configuration. The end 30′ is swaged and trimmed in a manner similar to that heretofore described, to provide a surface 32′, another surface 36′, a tip end 38′, substantially as in the first embodiment. The principal difference being that there is a different form of stop or locater 40′, which comprises simply a sloping shoulder on the tip. This is indicated at 40′. The embodiment of FIGURE 7, while simplified over that of FIGURE 2, has the slight disadvantage that lateral movement is permitted. The FIGURE 7 embodiment, however, will be found to be entirely adequate for many uses.

It will be understood that while the connector rod of the invention has been described and illustrated with each end thereof formed in the same fashion, it is to be understood that only one end could be formed according to the invention and the other end could be connected to a driving or driven member in any known conventional manner. Various other modifications of the invention will occur to one skilled in the art, and such modifications are contemplated within the scope of the appended claims.

I claim:

1. In combination a drive member, a driven member and a connecting link between said members, each of said members being provided with a cylindrical aperture, said connecting link being provided at at least one end with a hooked portion, said portion being in said aperture whereby said member and said link will move in unison, said portion being further provided with a swaged tip of reduced thickness, and tip having a trim line and a locator, said locator being adapted to prevent withdrawal of said portion from said aperture when said link is in operating position, the distance from said trim line to the extreme end of said locator being less than the diameter of said aperture and said locator being formed with a side which is parallel to said trim line.

2. The invention of claim 1 in which the said locator is formed with an extreme end having a surface substantially parallel to the axis of said portion and further having a recess between said extreme end and said portion, said recess being adapted to provide clearance to permit said connector link end to be inserted into said recess at an angle and then rotated into operating position.

3. A connector rod for connecting a driving member to a driven member comprising a wire or rod of required length, a bent over end portion on said rod, a tip of reduced thickness on said end portion, said tip having a sloping shoulder joining the center line of said end portion to an outer diameter of said end portion and said tip also having a locator portion opposite said shoulder, said locator being adapted to prevent lateral withdrawal of said end portion from a cylindrical hole in a member to which the said rod is connected.

4. A connector rod according to claim 3 in which the said locator comprises a pivot point located substantially opposite the juncture of said shoulder with the outer diameter of said end portion.

5. A connector rod according to claim 3 in which the said locator comprises a surface substantially parallel to said shoulder.

No references cited.

MILTON KAUFMAN, *Primary Examiner.*